(12) United States Patent
Wu et al.

(10) Patent No.: US 10,160,875 B2
(45) Date of Patent: *Dec. 25, 2018

(54) AQUEOUS COATING COMPOSITION AND PROCESS OF MAKING THE SAME

(71) Applicant: Dow Global Technologies LLC, Midland, MI (US)

(72) Inventors: Yan Wu, Shanghai (CN); Yawei Xu, Shanghai (CN); Xiaohong Yang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/537,557

(22) PCT Filed: Dec. 19, 2014

(86) PCT No.: PCT/CN2014/094343
§ 371 (c)(1),
(2) Date: Jun. 19, 2017

(87) PCT Pub. No.: WO2016/095200
PCT Pub. Date: Jun. 23, 2016

(65) Prior Publication Data
US 2017/0355873 A1    Dec. 14, 2017

(51) Int. Cl.
| | | |
|---|---|---|
| *C09D 7/00* | (2018.01) | |
| *C09D 7/63* | (2018.01) | |
| *C09D 7/62* | (2018.01) | |
| *C08F 265/06* | (2006.01) | |
| *C09D 151/00* | (2006.01) | |
| *C09D 5/02* | (2006.01) | |
| *C09D 133/12* | (2006.01) | |
| *C08K 5/06* | (2006.01) | |

(52) U.S. Cl.
CPC .............. *C09D 7/63* (2018.01); *C08F 265/06* (2013.01); *C09D 5/024* (2013.01); *C09D 5/028* (2013.01); *C09D 7/62* (2018.01); *C09D 133/12* (2013.01); *C09D 151/00* (2013.01); *C08K 5/06* (2013.01)

(58) Field of Classification Search
None
See application file for complete search history.

(56) References Cited

U.S. PATENT DOCUMENTS

| | | | | |
|---|---|---|---|---|
| 2,630,410 A | * | 3/1953 | Clapsadle | C01B 33/1415 516/86 |
| 4,587,340 A | | 5/1986 | Nichol et al. | |
| 5,096,617 A | * | 3/1992 | Ball | B01D 19/0404 516/116 |
| 5,102,970 A | * | 4/1992 | Wang | C08G 59/063 427/98.3 |
| 5,368,833 A | * | 11/1994 | Johansson | C01B 33/149 423/338 |
| 6,720,368 B2 | * | 4/2004 | Field | C09D 5/04 523/200 |
| 6,927,251 B2 | * | 8/2005 | Rische | C08K 3/36 524/492 |
| 2013/0089745 A1 | | 4/2013 | Hills et al. | |

FOREIGN PATENT DOCUMENTS

| | | |
|---|---|---|
| CA | 2440986 A1 | 9/2002 |
| CN | 1898345 A | 1/2007 |
| CN | 101602508 A | 12/2009 |
| CN | 102190936 A | 9/2011 |
| CN | 102399483 A | 4/2012 |
| CN | 102585618 A | 7/2012 |
| CN | 102702898 A | 10/2012 |
| CN | 103360881 * | 10/2013 |
| CN | 103613702 A | 3/2014 |
| JP | 61047766 A | 3/1986 |
| JP | 2003242885 A | 8/2003 |
| JP | 2009084542 A | 4/2009 |
| JP | 2004491313 | 6/2010 |

OTHER PUBLICATIONS

Iler, K., Sols of Silica Particles With Modified Surfaces; The Chemistry of Silica; John Wiley & Sons; pp. 407-409; 1979.
Brandup, et al; Polymer Handbook; pp. 209, 215-227; Interscience Publishers.
Leo, Calculating Log Poct From Structures, Chemical Review, vol. 93, Issue 4, pp. 1281-1306, 1993.
International Preliminary Report on Patentability; International Application No. PCT/CN2014/094343; International Filing Date Dec. 19, 2014; dated Jun. 20, 2017; 4 pages.
International Search Report; International Application No. PCT/CN2014/094343; International Filing Date Dec. 19, 2014; dated Aug. 25, 2015; 5 pages.
Written Opinion of the International Searching Authority; International Application No. PCT/CN2014/094343; International Filing Date Dec. 19, 2014; dated Aug. 25, 2015; 3 pages.

* cited by examiner

*Primary Examiner* — Melvin C. Mayes
*Assistant Examiner* — Colette B Nguyen
(74) *Attorney, Agent, or Firm* — Karl E. Stauss; Cantor Colburn LLP

(57) ABSTRACT

A low VOC aqueous coating composition capable of providing coating films with balanced properties of low gloss and good stain resistance.

10 Claims, No Drawings

AQUEOUS COATING COMPOSITION AND PROCESS OF MAKING THE SAME

FIELD OF THE INVENTION

The present invention relates to an aqueous coating composition and a process of making the same.

INTRODUCTION

Matt coating films are coating films having low gloss, normally at a level of below 30 on a 60° Gardner Gloss scale in the wood coating industry. The gloss of coating films is directly related to their micro-scale surface roughness. Use of conventional matting agents can increase the micro-scale surface roughness of coating films and decrease their gloss. To achieve low gloss, typically at least 1-3% by weight matting agents, based on the solids weight of the coating compositions, are added into the coating composition. Such high dosage of matting agents, however, usually results in undesirably low stain resistance such as coffee resistance of coating films. Many coating applications, particularly wood coatings, require coating films having sufficient stain resistance to meet industry requirements. In particular, it is a challenge for pigmented white coatings containing titanium dioxide ($TiO_2$) to meet industry requirements for coffee resistance. In addition, it is always desirable for coating compositions to have a low content of volatile organic components (VOC), for example, no more than 70 grams of VOC per liter of coating composition according to international or national standards such as the HJ 2537-2014 method.

Therefore, it is desirable to provide a low VOC coating composition that provides coating films with balanced properties of low gloss and good stain resistance described above.

SUMMARY OF THE INVENTION

The present invention provides a novel aqueous coating composition with a low VOC content that provides coating films with low gloss and good stain resistance. Such aqueous coating composition is a novel combination of an aqueous acrylic polymer dispersion, anionic colloidal silica, a specific solvent, ammonia, and titanium dioxide. The coating composition, without the use of conventional matting agents, provides white coating films with a gloss level of 20 or lower on a vinyl chart or 30 or lower on wood on a 60° Gardner Gloss scale, and good coffee resistance indicated by both delta b and delta E values lower than 2.0, according to the test methods described in the Examples section. In addition, the coating composition of the present invention also provides coating films with better stain resistance to vinegar and ink than coating compositions containing conventional matting agents.

In a first aspect, the present invention is an aqueous coating composition comprising, based on the total solids weight of the aqueous coating composition, (a) an aqueous acrylic polymer dispersion present in an amount of from 10% to 90% by solids weight;

(b) anionic colloidal silica present in an amount of from 0.1% to 4.3% by solids weight;

(c) a solvent present in an amount of from 0.1% to 7% by weight, wherein the solvent has the following formula:

wherein $R_1$ is a saturated hydrocarbon group having from 1 to 6 carbon atoms; $R_2$ is —$CH_2CH_2$— or —$CH_2CH(CH_3)$—; and n is an integer from 1 to 4 when $R_2$ has the structure of —$CH_2CH_2$—, or n is an integer from 2 to 4 when $R_2$ has the structure of —$CH_2CH(CH_3)$—;

(d) ammonia present in an amount of from 0.55% to 4.2% by weight;

(e) an amine compound present in an amount less than 1.2% by weight; and (f) titanium dioxide.

In a second aspect, the present invention is an aqueous coating composition comprising, based on the total solids weight of the aqueous coating composition, (a) an aqueous acrylic polymer dispersion present in an amount of from 20% to 80% by solids weight;

(b) anionic colloidal silica present in an amount of from 1% to 3.5% by solids weight;

(c) a solvent present in an amount of from 1% to 6% by weight, wherein the solvent has the following formula:

$R_1$—$(OR_2)_n$—OH wherein $R_1$ is a saturated hydrocarbon group having from 1 to 6 carbon atoms; $R_2$ is —$CH_2CH_2$— or —$CH_2CH(CH_3)$—; and n is an integer from 1 to 4 when $R_2$ has the structure of —$CH_2CH_2$—, or n is an integer from 2 to 4 when $R_2$ has the structure of —$CH_2CH(CH_3)$—;

(d) ammonia present in an amount of from 1% to 3% by weight;

(e) an amine compound present in an amount less than 1% by weight; and (f) titanium dioxide.

In a third aspect, the present invention is a process of preparing the aqueous coating composition of the first or second aspect. The process comprises admixing:

(a) the aqueous acrylic polymer dispersion, (b) the anionic colloidal silica, (c) the solvent, (d) ammonia, (e) the amine compound, and (f) titanium dioxide.

DETAILED DESCRIPTION OF THE INVENTION

"Acrylic" herein includes (meth)acrylic acid, (meth)alkyl acrylate, (meth)acrylamide, (meth)acrylonitrile and their modified forms such as (meth)hydroxyalkyl acrylate.

The glass transition temperature ("$T_g$") values used herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g(calc.)$ is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E. H. Immergut, Interscience Publishers.

The aqueous acrylic polymer dispersion useful in the present invention comprises acrylic emulsion copolymer particles. The acrylic emulsion copolymer may comprise, as copolymerized units, one or more ethylenically unsaturated nonionic monomers. "Nonionic monomers" herein refer to monomers that do not bear an ionic charge between pH=1-14. Examples of suitable ethylenically unsaturated nonionic monomers include (meth)acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, hydroxypropyl methacrylate or mixtures thereof; and (meth)acrylonitrile. Other suitable nonionic monomers may be further added, for example, styrene and substituted styrene, or other vinyl monomers such as vinyl acetate, vinyl butyrate, vinyl versatate and other vinyl esters, vinyl chloride, vinylidene chloride or mixtures thereof. In some preferred embodiments, the ethylenically unsaturated nonionic monomers comprise from 60% to 98% by weight of (meth)acrylic ester monomers, based on the total weight of the ethylenically unsaturated nonionic monomers.

The acrylic emulsion copolymer useful in the present invention may comprise, based on the weight of the acrylic emulsion copolymer, 70% by weight or more of the copolymerized nonionic monomer, 75% by weight or more, or even 80% by weight or more, and at the same time, 99% by weight or less, 95% by weight or less, or even 90% by weight or less.

The acrylic emulsion copolymer useful in the present invention may comprise, as copolymerized units, one or more ethylenically unsaturated anionic monomers. "Ethylenically unsaturated anionic monomers" include, for example, polymerizable acids, anhydrides, and the metal ion (for example, Li, Na, K, Ca) and ammonium ion salts thereof. Examples of suitable polymerizable ethylenically unsaturated anionic monomers include acrylic acid, methacrylic acid, itaconic acid, phosphorus acid monomers like dihydrogen phosphate monomers including 2-phosphoethyl (meth)acrylate, vinyl phosphonic acid, and allyl phosphonic acid; fumaric acid; maleic acid; monomethyl itaconate; monomethyl fumarate; monobutyl fumarate; maleic anhydride; 2-acrylamido-2-methyl-1-propanesulfonic acid; sodium salt of 2-acrylamido-2-methyl-1-propanesulfonic acid; ammonium salt of 2-acrylamido-2-methyl-1-propane sulfonic acid; sodium vinyl sulfonate; sodium salt of allyl ether sulfonate; and mixtures thereof. In some preferred embodiments, acrylic acid, methacrylic acid, itaconic acid, 2-phosphoethyl methacrylate, or a mixture thereof is used as the ethylenically unsaturated anionic monomer. The acrylic emulsion copolymer useful in the present invention may comprise, based on the weight of the acrylic emulsion copolymer, 0.1% by weight or more of the copolymerized ethylenically unsaturated anionic monomer, 0.5% by weight or more, or even 1% by weight or more, and at the same time, 20% by weight or less, 10% by weight or less, or even 5% by weight or less.

The acrylic emulsion copolymer useful in the present invention may further comprise, as copolymerized units, one or more ethylenically unsaturated monomers having one or more functional groups as self-crosslinking agents. The functional groups may be selected from carbonyl, acetoacetate, alkoxysilane, ureido, amide, imide, amino group, or mixtures thereof. Examples of suitable monomers include, for example, diacetone acrylamide (DAAM), acetoacetoxyethyl (meth)acrylate, acetoacetoxypropyl (meth)acrylate, acetoacetoxybutyl (meth)acrylate, 2,3-di(acetoacetoxy) propyl (meth)acrylate, allyl acetoacetates, vinyl acetoacetates, acetoacetamides of Formula (I):

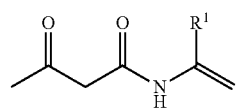

Formula (I)

wherein $R^1$ is H or methyl, or combinations thereof. Preferably, an ethylenically unsaturated monomer bearing a carbonyl group such as DAAM or acetoacetoxyethyl (meth)acrylate is used as the self-crosslinking agent. The acrylic emulsion copolymer useful in the present invention may comprise, based on the weight of the acrylic emulsion copolymer, 0.1% by weight or more of the copolymerized functional-group-containing ethylenically unsaturated monomer, 0.5% by weight or more, or even 1% by weight or more, and at the same time, 20% by weight or less, 10% by weight or less, or even 5% by weight or less.

The aqueous acrylic polymer dispersion useful in the present invention may further comprise one or more compounds containing at least two —$NH_2$ or —NH— functionalities, or polyfunctional carboxylic hydrazide as crosslinking agents. Examples of suitable crosslinking agents include adipic dihydrazide, sebacic dihydrazide, polyhydrazide, or mixtures thereof. Preferably, the polyfunctional carboxylic hydrazide is adipic dihydrazide. In some embodiments, the aqueous acrylic polymer dispersion comprises adipic dihydrazide when the copolymer comprises the polymerized units of DAAM. When present, the concentration of the crosslinking agent may be, based on the solids weight of the aqueous emulsion polymer, 0.05% by weight or more, 0.2% by weight or more, or even 0.5% by weight or more, and at the same time, 10% by weight or less, 5% by weight or less, 2% by weight or less, or even 1% by weight or less.

In some embodiments, the acrylic emulsion copolymer useful in the present invention may be a multistage polymer. The multistage polymer may comprise:

(A) a polymer A comprising as polymerized units, based on the weight of the polymer A, (a1) from 75% to 92% by weight of a (meth)acrylic acid alkyl ester having a $C_1$ to $C_2$ alkyl group including, for example, methyl (meth)acrylate, ethyl (meth)acrylate, or mixtures thereof;

(a2) from 2.1% to 10% by weight of the self-crosslinking agent described above including, for example, the carbonyl-containing functional monomer such as DAAM; and (a3) from 5% to 15% by weight of an acid monomer comprising from 4% to 14% by weight of an α, β-ethylenically unsaturated carboxylic acid including, for example, (meth)acrylic acid, itacolic acid, fumaric acid, or mixtures thereof; and from 1% to 9% by weight of a phosphorous-containing acid monomer including, for example, phosphoalkyl (meth)acrylates such as phosphoethyl (meth)acrylate, phosphopropyl (meth)acrylate, phosphobutyl (meth)acrylate, salts thereof, or mixtures thereof; and (B) a polymer B comprising as polymerized units, based on the weight of the polymer B, (b1) from 81% to 99% by weight of a hydrophobic monomer selected from a vinyl aromatic monomer including, for example, styrene or substituted styrene; a hydrophobic (meth)acrylic acid alkyl ester including, for example, butyl (meth)acrylate, iso-butyl (meth)acrylate, 2-ethylhexyl acrylate, lauryl (meth)acrylate, or stearyl (meth)acrylate; or mixtures thereof;

(b2) from 0.8% to 10% by weight of self-crosslinking agent described above including, for example, the carbonyl-containing functional monomer such as DAAM; and (b3) from 0 to 15% by weight of a hydrophilic monomer including, for example, methyl (meth)acrylate, ethyl (meth) acrylate, or mixtures thereof.

"Hydrophobic" monomer herein refers to a monomer that has a Hansch value ≥2.20. "Hydrophilic" monomer herein refers to a monomer that has a Hansch value <2.20, Hansch values may be determined by the method described by A. J. Leo in Chem. Rev., 93(4):1281-1306 (1993). The polymer A may have a number average molecular weight ($M_n$) of from 3,000 to 100,000. The polymer B may have a "$T_g$" at least 40° C. lower than that of the polymer A. The weight ratio of the polymer A to the polymer B may be from 25:75 to 50:50.

$M_n$ herein may be determined by Gel Permeation Chromatography (GPC) analysis or calculated as follows, $$Mn=[W(\text{monomer})+W(\text{CTA})]/\text{Mole}(\text{CTA}),$$

wherein W(monomer) is the total weight of monomers used in preparing the polymer A, W(CTA) is the total weight of the chain transfer agent used in preparing the polymer A, and Mole(CTA) is the total moles of the chain transfer agent used in preparing the polymer A.

The aqueous acrylic polymer dispersion useful in the present invention may be prepared by polymerization techniques well known in the art such as suspension polymerization or emulsion polymerization of the monomers described above. Emulsion polymerization is a preferred process. Emulsion polymerization techniques for preparing the aqueous dispersion of the copolymer particles are well known in the polymer arts, and include multiple stage polymerization processes. In some embodiments, the aqueous acrylic polymer dispersion is prepared by a multistage free-radical polymerization in which at least two stages are formed sequentially, which usually results in the formation of at least two polymer compositions.

For each monomer, the concentration of the monomer based on the total weight of monomers used in preparing the acrylic polymer dispersion is substantially the same as the concentration of copolymerized such monomer based on the total weight of the copolymer.

The aqueous acrylic polymer dispersion may be prepared by emulsion polymerization from the monomers described above in the presence of a surfactant. These surfactants may include anionic and/or nonionic emulsifiers. for example, alkyl ethoxylated phosphate or alkylphenol ethoxylated phosphate surfactant; alkali metal or ammonium salts of alkyl, aryl, or alkylaryl sulfates, sulfonates or phosphates; alkyl sulfonic acids; sulfosuccinate salts; fatty acids;

ethylenically unsaturated surfactant monomers; and ethoxylated alcohols or phenols. The amount of the surfactant used is usually from 0.1% to 6% by weight, based on the total weight of monomers. In some preferred embodiments, the alkyl ethoxylated phosphate or alkylphenol ethoxylated phosphate surfactant is used. Temperature suitable for emulsion polymerization processes may be lower than 100° C., in the range of from 30° C. to 95° C., or in the range of from 50° C. and 90° C. A mixture of the monomers may be added neat or as an emulsion in water. The monomer mixture may be added in one or more additions or continuously, linearly or nonlinearly, over the reaction period, or combinations thereof. The surfactant may be added prior to or during the polymerization of the monomers, or combinations thereof. A portion of the surfactant can also be added after the polymerization. In some embodiments, the process of preparing the aqueous acrylic polymer dispersion further includes adding the compound containing at least two —$NH_2$ or —NH— functionalities or the polyfunctional carboxylic hydrazide after the polymerization.

In the emulsion polymerization process, free radical initiators may be used. Examples of suitable free radical initiators include hydrogen peroxide, sodium peroxide, potassium peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers.

Redox systems comprising the above described initiators coupled with a suitable reductant may be used in the emulsion polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, glycolic acid, glyoxylic acid hydrate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used. Chelating agents for the metals may optionally be used.

In the emulsion polymerization process, one or more chain transfer agents may also be used. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The train transfer agent may be used in an effective amount to control the molecular weight of the obtained acrylic emulsion copolymer. For example, the concentration of the chain transfer agent may be, based on the total weight of monomers, from 0.01% to 5% by weight, from 0.05% to 3% by weight, or from 0.1% to 2% by weight.

In the emulsion polymerization process, organic bases and/or inorganic bases may also be used as neutralizers. Suitable bases include ammonia, sodium hydroxide, potassium hydroxide, zinc oxide, mono-ethanolamine, triethyl amine, diethyl amine, dimethyl amine, sodium borate, potassium borate, aluminum hydroxide, or combinations thereof.

The aqueous acrylic polymer dispersion useful in the present invention may contain solids present from 30% to 70% by weight, from 35% to 60% by weight, or from 40% to 50% by weight, based on the total weight of the aqueous acrylic polymer dispersion. Suitable commercially available aqueous acrylic polymer dispersions include, for example, ROSHIELD™ 3311 aqueous polymer dispersion available from The Dow Chemical Company (ROSHIELD is a trademark of The Dow Chemical Company).

The types and levels of the monomers described above may be chosen to provide the acrylic emulsion copolymer with $T_g$ suitable for different applications. The $T_g$ of the acrylic emulsion copolymer may be in the range of from −35° C. to 70° C., from −20° C. to 60° C., or from −10° C. to 45° C.

The aqueous acrylic polymer dispersion in the coating composition of the present invention may be present, by solids weight based on the total weight of the coating composition, in an amount of 10% or more, 20% or more, or even 30% or more, and at the same time, 90% or less, 75% or less, or even 60% or less.

The aqueous coating composition of the present invention may further comprise anionic colloidal silica. "Anionic colloidal silica" herein refers to a dispersion of anionic amorphous silicon dioxide ($SiO_2$) particles, which are typically dispersed in water, suitably in the presence of stabilizing cations such as $K^+$; $Na^+$; $Li^+$; $NH_4^+$; organic cations; primary, secondary, tertiary and quaternary amines; and mixtures thereof. The surface of the anionic colloidal silica is composed mostly of hydroxyl groups with the formula of Si—O—H. Other groups may also exist including, for example, silanediol (—Si—$(OH)_2$), silanetriol (—Si$(OH)_3$), surface siloxanes (—Si—O—Si—O—), and surface-bound water. The anionic colloidal silica usually has a pH value >7.5, >8, >8.5, or even 9 or more, and at the same time, 11.5 or less, or even 11 or less.

The anionic colloidal silica may be derived from, for example, precipitated silica, fumed silica, pyrogenic silica or silica gels, and mixtures thereof. Silica particles in the anionic colloidal silica may be modified and can contain other elements such as amines, aluminium and/or boron. Boron-modified colloidal silica particles may include those described in, for example, U.S. Pat. No. 2,630,410. Aluminium-modified colloidal silica may have an aluminum oxide ($Al_2O_3$) content of from about 0.05% to 3% by weight, and preferably from 0.1% to 2% by weight, based on total solids weight of the anionic colloidal silica. The procedure of preparing the aluminium-modified colloidal silica is further described in, for example, "The Chemistry of Silica", by Iler, K. Ralph, pages 407-409, John Wiley & Sons (1979) and in U.S. Pat. No. 5,368,833.

Silica content of the anionic colloidal silica may be present, based on the weight of the anionic colloidal silica, from 10% to 80% by weight, from 12% to 70% by weight, or from 15% to 60% by weight.

The silica particles in the anionic colloidal silica may have an average particle diameter ranging from about 2 to about 100 nanometers (nm), from about 3 to about 80 nm, from about 4 to about 50 nm, or from about 5 to about 40 nm. The silica particles in the anionic colloidal silica may have a specific surface area of from 20 to 800 square meters per gram ($m^2/g$), from 30 to 750 $m^2/g$, or from 50 to 700 $m^2/g$. The particle size and specific surface area of the silica particles may be measured by the methods described in the Examples section below.

The anionic colloidal silica in the aqueous coating composition may be present, by solids weight based on the total weight of the aqueous coating composition, in an amount of 0.1% or more, 0.5% or more, or even 1% or more, and at the same time, 4.3% or less, 3.5% or less, or even 2.5% or less. Suitable commercially available anionic colloidal silica includes, for example, BINDZIL™ 215, BINDZIL 2040 and BINDZIL 40130 colloidal silica all available from Akzo Nobel; LUDOX™ AS-40 colloidal silica available from Grace; or mixtures thereof.

The aqueous coating composition of the present invention may further comprise one or more solvents having the following structure:

$R_1$—$(OR_2)_n$—OH wherein $R_1$ is a saturated hydrocarbon group having from 1 to 6 carbon atoms, $R_2$ is —$CH_2CH_2$— or —$CH_2CH(CH_3)$—; and n is an integer from 1 to 4 when $R_2$ has the structure of —$CH_2CH_2$—, or n is an integer from 2 to 4 when $R_2$ has the structure of —$CH_2CH(CH_3)$—. $R_1$ has the structure of $C_mH_{2m+1}$—, wherein m is an integer from 1 to 6 and preferably from 1 to 4.

Examples of suitable solvents include ethylene glycol monobutyl ether, ethylene glycol monohexyl ether, diethylene glycol methyl ether, diethylene glycol monobutyl ether, dipropylene glycol n-butyl ether, dipropylene glycol n-propyl ether, dipropylene glycol methyl ether, or mixtures thereof. In some preferred embodiments, dipropylene glycol n-butyl ether, ethylene glycol monobutyl ether, diethylene glycol monobutyl ether, diethylene glycol methyl ether, or a mixture thereof is used as the solvent. The concentration of the solvent may be, based on the total solids weight of the aqueous coating composition, present in an amount of 0.1% by weight or more, 1% by weight or more, or even 2% by weight or more, and at the same time, 7% by weight or less, 6% by weight or less, or even 5% by weight or less.

The aqueous coating composition of the present invention may further comprise ammonia. The combination of ammonia with the solvent may be used as a promoter to decrease the gloss of coating films obtained from the aqueous coating composition. Ammonia is typically added as an aqueous ammonia solution. Ammonia may be present, based on the total solids weight of the aqueous coating composition, 0.55% by weight or more, 0.60% by weight or more, 0.70% by weight or more, 1% by weight or more, or even 1.2% by weight or more, and at the same time, 4.2% by weight or less, 3% by weight or less, or even 2% by weight or less.

The aqueous coating composition of the present invention may comprise one or more amine compounds that are different from ammonia. The amine compounds may comprise monoamines, diamines, multifunctional amines, polyether amines, or mixtures thereof. The monoamines may be selected from alkyl monoamines, beta-hydroxyl monoamines containing up to two hydroxyl groups, or mixtures thereof. Examples of suitable amine compounds include monoamines such as n-butylamine, 2-amino-2-methyl-1-propanol, 2-aminoethanol, 2-methylaminoethanol, octyl amine, cyclohexylamine, butylamine, N-methylethanolamine (N-MEA), or 1-aminopropan-2-ol; or diamines such as isophorone diamine (IPDA), dimethylaminoethanol (DMEA), or mixtures thereof. When used, the amine compound should be present in an amount without compromising the coffee resistance of the obtained coating films. The concentration of the amine compound may be, by weight based on the total weight of the aqueous coating composition, less than 1.2%, less than 1%, less than 0.5%, less than 0.4%, or even less than 0.2%.

The aqueous coating composition of the present invention may further comprise titanium dioxide. The concentration of titanium dioxide may be, by weight based on the total solids weight of the aqueous coating composition, 25% or more, 30% or more, or even 40% or more, and at the same time, 70% or less, 60% or less, or even 50% or less.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydroxypropyl cellulose. Preferably, the thickener is based on HEUR. When present, the concentration of the thickener is, based on the total weight of the aqueous coating composition, generally from 0.05% to 3% by weight, from 0.1% to 2% by weight, or from 0.3% to 1% by weight.

The aqueous coating composition of the present invention may further comprise one or more wetting agents. "Wetting agent" herein refers to a chemical additive that reduces the surface tension of a coating composition, causing the coating composition to more easily spread across or penetrate the surface of a substrate. Wetting agents may be polycarboxylates, anionic, zwitterionic, or non-ionic. When present, the concentration of the wetting agent may be, by weight based on the total weight of the coating composition, from 0.1% to 2.5%, from 0.5% to 2%, or from 1% to 1.5%.

The aqueous coating composition of the present invention may further comprise one or more defoamers. "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. When present, the concentration of the defoamer may be, by weight based on the total weight of the coating composition, generally from 0.01% to 1%, from 0.05% to 0.8%, or from 0.1% to 0.5%.

The aqueous coating composition of the present invention is preferably substantially free of silane coupling agents. "Substantially free of silane coupling agents" herein means that the silane coupling agents are not incorporated into the coating composition; but low levels of silane coupling agents may be, for example, adventitiously introduced as impurities in defoamers, wetting agents and dispersants, added during the preparation of the anionic colloidal silica, or may be formed during the polymerization of the aqueous acrylic emulsion polymer. In any event, less than 0.3% by weight, based on the total weight of the coating composition, of silane coupling agents is present in the coating composition. "Silane coupling agents" herein refer to molecules with the structure of R—Si—(X)$_3$, wherein R is selected from vinyl, amino, chloro, epoxy, mercapto, or combinations thereof; and X is selected from methoxy, ethoxy or combinations thereof. Examples of suitable silane coupling agents include alkyl silanes such as (3-aminopropyl)triethoxysilane, ethyl triethoxysilane, and gamma-glycidoxypropyltrimethoxysilane; epoxy silane; or mixtures thereof.

In some preferred embodiments, the aqueous coating composition of the present invention is substantially free of matting agents. "Substantially free of matting agents" as used herein means that the aqueous coating composition comprises less than 0.1% by weight of matting agents, based on the total solids weight of the aqueous coating composition. "Matting agents" herein refers to any inorganic or organic particles that provide matt effects. The matting agents may be a silica, polyurea, polyacrylate, polyethylene, or polytetrafluoroethene matting agent; or mixtures thereof. The matting agent may be in the form of powders or an emulsion.

In some preferred embodiments, the aqueous coating composition of the present invention comprises, based on the total solids weight of the aqueous coating composition,
 (a) from 20% to 80% by solids weight of the aqueous acrylic polymer dispersion;
 (b) from 1% to 3.5% by solids weight of the anionic colloidal silica;
 (c) from 1% to 6% by weight of the solvent;
 (d) from 1% to 3% by weight of ammonia;
 (e) less than 1% by weight of the amine compound; and
 (f) titanium dioxide.

The aqueous coating composition of the present invention may further comprise water. The concentration of water may be, by weight based on the total weight of the aqueous coating composition, from 30% to 90%, from 40% to 80%, or from 60% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents, dispersants, thixotropic agents, adhesion promoters, and grind vehicles. When present, these additives may be present in a combined amount of from 0.001% to 10% by weight, or from 0.01% to 2% by weight, based on the total weight of the aqueous coating composition.

The aqueous coating composition of the present invention may have no more than 70 grams of VOC per liter of aqueous coating composition (g/L) according to the HJ 2537-2014 method.

The coating composition of the present invention may be prepared with techniques known in the coating art. The process of preparing the aqueous coating composition of the present invention may comprise by admixing the aqueous acrylic emulsion polymer, TiO$_2$, the anionic colloidal silica, the solvent, ammonia, and water. Other optional components may also be added as described above. Components in the aqueous coating composition may be mixed in any order to provide the aqueous coating composition of the present invention. Any of the above-mentioned optional components may also be added to the composition during or prior to the mixing to form the aqueous coating composition.

The present invention also provides a method of imparting both low gloss and good coffee resistance to a substrate. The method comprises: forming the aqueous coating composition, applying the aqueous coating composition to a substrate, and drying the applied coating composition to form the coating. "High gloss" means a gloss level of 20 or less on a vinyl chart or a gloss level of 30 or less on wood on a 60° Gardner Gloss scale, and "good coffee resistance" means both db and dE values smaller than 2.0; according to the test methods described in the Examples section below. The method may also impart a substrate better stain resistance to vinegar and black ink, as compared to a coating composition comprising conventional matting agents. The coating obtained therefrom, i.e., the coating film after drying the coating composition applied to the substrate, has the low gloss and good stain resistance. The method of preparing the coating may comprise: forming the aqueous coating composition of the present invention, applying the aqueous coating composition to a substrate, and drying, or allowing to dry, the applied coating composition to form the coating.

The process of using the aqueous coating composition of the present invention may comprise the following: applying the aqueous coating composition to a substrate, and drying, or allowing to dry, the applied coating composition. The coating composition of the present invention can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition may be dried, or be allowed to dry, at room temperature (21-25° C.), or at an elevated temperature, for example, from 35° C. to 60° C. to form a film (this is, coating).

The aqueous coating composition of the present invention can be applied to, and adhered to, various substrates. Examples of suitable substrates include wood, metals, plastics, foams, stones, elastomeric substrates, glass, fabrics, concrete, or cementious substrates. The coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for industrial coatings. The aqueous coating composition can be used alone, or in combination with other coatings to form multi-layer coatings.

Examples

Some embodiments of the invention will now be described in the following Examples, wherein all parts and percentages are by weight unless otherwise specified. The following materials are used in the examples:

Methyl methacrylate ("MMA"), methacrylic acid ("MAA"), ammonium persulfate ("APS"), methyl 3-mercaptopropionate ("MMP"), 2-ethylhexyl acrylate ("EHA"), and styrene ("ST") are all available from Sinoreagent Group.

Phosphoethyl methacrylate ("PEM") is available from The Dow Chemical Company.

Diacetone acrylamide ("DAAM") and adipic dihydrazide ("ADH") are both available from Kyowa Hakko Chemical Co., Ltd.

DISPONIL™ Fes-32 surfactant ("Fes-32"), available from BASF, is a sodium salt of fatty alcohol ether sulphate.

AMP™-95, available from The Dow Chemical Company, is 2-amino-2-methyl-1-propanoland (AMP is a trademark of The Dow Chemical Company).

OROTAN™ 731A, available from The Dow Chemical Company, is a sodium polycarboxylic acid and used as a dispersant (OROTAN is a trademark of The Dow Chemical Company).

SURFYNOL™ 420, available from Air Product, is an ethoxylated wetting agent and used as a surfactant.

TEGO™ Airex 902 W ("Airex 902 W"), available from Evonik, is an emulsion of polyether-siloxane and used as a defoamer.

ACRYSOL RM-8W is a nonionic urethane rheology modifier and available from The Dow Chemical Company.

TI-PURE™ R-706 titanium dioxide, available from DuPont, has a median particle size of 0.36 microns and is used as pigment.

XY 0504 acrylic latex, available from The Dow Chemical Company, is self-prepared as described below.

PRIMAL™ Binder U-91, available from The Dow Chemical Company, is a polyurethane dispersion (PRIMAL is a trademark of The Dow Chemical Company).

Isophorone diamine ("IPDA") is available from BASF.

N-methylethanolamine ("N-MEA") is available from The Dow Chemical Company.

Dimethylaminoethanol ("DMEA") and an aqueous ammonia solution are both available from Sinopharm Chemical Reagent Co., Ltd.

ACEMATT™ TS-100 ("TS 100") matting agent, available from Evonik, is fumed silica powder having an average particle size of 9.5 microns.

DEUTERON™ MK ("MK") matting agent, available from Deuteron, is based on polyurea powder having an average particle size of 6.3 microns.

Colloidal silica used in the examples are described below.

| Colloidal Silica | Description | Solids | Particle size | Specific surface area | pH | Supplier |
|---|---|---|---|---|---|---|
| BINDZIL 2040 | amorphous $SiO_2$ (ionized surface) | 40% | 15 nm | 200 $m^2/g$ | 10 | Akzo Nobel |
| BINDZIL 215 | amorphous $SiO_2$ (ionized surface) | 15% | 4.5 nm | 650 $m^2/g$ | 11 | |
| LEVASIL 30/50 | amorphous $SiO_2$ (ionized surface) | 50% | 75 nm | 35 $m^2/g$ | 9.5 | |
| LUDOX TMA | Surface modified $SiO_2$ | 34% | 22 nm | 122 $m^2/g$ | 4-7 | W. R. Grace & Co. |

Solvents all available from The Dow Chemical Company are described below.

| Solvent | Chemical Name |
|---|---|
| DOWANOL PM | Propylene glycol methyl ether ("PM") |
| DOWANOL DPM | Dipropylene glycol methyl ether ("DPM") |
| DOWANOL PMA | Propylene glycol methyl ether acetate ("PMA") |
| DOWANOL PnP | Propylene glycol n-propyl ether ("PnP") |
| DOWANOL DPnP | Dipropylene glycol n-propyl ether ("DPnP") |
| DOWANOL PnB | Propylene glycol n-butyl ether ("PnB") |
| DOWANOL DPnB solvent | Dipropylene glycol n-butyl Ether ("DPnB") |
| Methyl CARBITOL | Diethylene glycol monomethyl ether ("DM") |
| Butyl CARBITOL solvent | Diethylene glycol monobutyl ether ("DB") |
| Butyl CELLOSOLVE solvent | Ethylene glycol monobutyl Ether ("EB") |
| Hexyl CELLOSOLVE | Ethylene glycol monohexyl Ether |
| Butoxytriglycol | Triethylene glycol monobutyl ether |

The following standard analytical equipment and methods are used in the Examples.

Average Particle Size and Specific Surface Area of Colloidal Silica

Average particle size and specific surface area of colloidal silica are determined according to the HG/T 2521-2008 method. One and half (1.50) grams (g) of colloidal silica are mixed with 100 g of deionized water in a beaker. The pH value of the resulting dispersion is adjusted to 3~3.5 with HCl or NaOH solutions. 30 g of NaCl are further added into the obtained dispersion, followed by adding deionized water to adjust the dispersion volume to 150 ml and to fully dissolve NaCl. The obtained dispersion is then titrated using a standard NaOH solution (about 0.1 mol/L). The accurate concentration of the standard NaOH used in the test is recorded and denoted as c. The volume of NaOH standard solution used for pH shifting from 4.00 ~9.00 is recoded and denoted as V.

The average particle size in nanometer, denoted as D, is determined by:

$$D=2727/(320Vc-25)$$

The specific surface area of colloidal silica, denoted as SA, is determined by:

$$SA=320Vc-25.$$

Preparation of Coating Films

When wood is used as a substrate, a coating composition is brushed onto wood surface at a loading of about 90-110 grams per square meter (g/m$^2$). After the first coat, the coating is left at room temperature (23-25° C.) for 4 hours, and then sanded with sand paper. The second coating layer is then brushed onto the wood substrate and dried at room temperature for 4 hours. After the third coat, the coating is dried at room temperature for 4 hours, and then placed in an oven at 50° C. for 48 hours before conducting gloss, coffee resistance, and stain resistance to black ink or vinegar tests described below, respectively.

When a vinyl chat is used as a substrate, a coating composition is applied onto the vinyl chart by drawdown with a wet film with a thickness of 120 μm. Only one coat is applied. The coating applied on the vinyl chart is dried at room temperature for 4 hours, and then placed in an oven at 50° C. for 48 hours before conducting the gloss test described below.

Gloss

The gloss of coating films is measured according to the ASTM D523 method using a BYK Micro-Tri-Gloss meter. Gloss being 30 or lower on wood or being 20 or lower on a vinyl chart is acceptable.

Coffee Resistance Test

For the coffee resistance test, disc type filter paper is first saturated with 4% instant coffee (available from Nestle). The paper is then placed on the above finished wood panels and covered with a cap to reduce evaporation. After 4 hours, the cap is removed. Tested areas are wiped with wet facial tissues, and dried at room temperature for 24 hours prior to measure L, a, b values by a BYK Gardner Spectro-Guide Sphere Gloss Color Spectrophotometer according to the ASTM D2244 method. $L_2$, $a_2$, $b_2$ values are measured on the tested areas. Initial $L_1$, $a_1$, $b_1$ values are measured on blank areas (that is, areas without coffee treatment). Then, delta b (db) and delta E (dE) values are determined by the following equations (1) and (2), respectively, $$db=b_1-b_2 \quad (1)$$

$$dE=\sqrt{(L_1-L_2)^2+(a_1-a_2)^2+(b_1-b_2)^2} \quad (2)$$

The lower db and dE values, the better the coffee resistance. Values of db and dE smaller than 2 are acceptable.

Stain Resistance to Black Ink and Vinegar

For the stain resistance test, disc type filter paper is first saturated with black ink and vinegar, respectively. The paper is then placed on the above finished wood panels and covered with a cap to reduce evaporation. After 2 hours, the cap is removed. Tested areas are wiped with wet facial tissues. After drying at room temperature for 24 hours, L, a, b values ($L_2$, $a_2$, $b_2$) of the tested areas are measured by a BYK Gardner Spectro-Guide Sphere Gloss Color Spectrophotometer according to the ASTM D2244 method. Initial L, a, b values ($L_1$, $a_1$, $b_1$) are measured on blank areas (that is, areas without black ink or vinegar treatment). Then, dE values are determined by the equation (2) described in the coffee resistance test above, respectively. The lower dE value, the better the stain resistance to black ink or vinegar.

Heat-Age Stability

A Stormer Viscosity Meter is used to test the viscosity of a coating composition according to the ASTM D562 method. After the coating composition is formed, an initial medium shear viscosity, Initial KU, of the coating composition is tested at room temperature, then the coating composition is balanced at room temperature overnight. Then, the viscosity of the coating composition is measured and recoded as Overnight KU. The coating composition is then placed in an oven at 50° C. for 1 day. The viscosity of the coating composition after storage is tested and recorded as Final KU. The difference between Overnight KU and Final KU is defined as the viscosity change, ΔKU. The smaller the ΔKU value, the better the heat-age stability will be.

Preparation of XY 0504 Aqueous Acrylic Polymer Dispersion

Preparation of Monomer Emulsion 1: Fes-32 surfactant (11.61 grams (g), 31% active) was dissolved in deionized (DI) water (414.20 g) with stirring. Then MMA (828.29 g), MAA (65.13 g), PEM (30.65 g), DAAM (33.51 g), and MMP (18.86 g) were slowly added into the resulting surfactant solution to obtain Monomer Emulsion 1.

A solution containing Fes-32 surfactant (3.87 g, 31% active) and deionized water (1667.4 g) was added into a 4-neck, 5-liter round bottom flask equipped with a thermocouple, a cooling condenser and an agitator, and was heated to 85° C. under nitrogen atmosphere. An aqueous APS initiator solution (0.88 g APS in 56.48 g deionized water), and 5.0% by weight of Monomer Emulsion 1 obtained above were then added into the flask. Within about 5 minutes, initiation of polymerization was confirmed by a temperature increase by 3° C. and a change of the external appearance of the reaction mixture. After heat generation stopped, the remaining Monomer Emulsion 1 was added gradually to the flask over a period of 60 minutes with stirring, and an aqueous APS initiator solution (2.06 g APS in 131.34 g deionized water) was added gradually to the flask over a period of 70 minutes. The temperature was maintained at 84-86° C. After Monomer Emulsion 1 and initiator solution were completed, the reaction mixture was hold for 30 min. An aqueous ammonia solution (250 g, 12.5% active) was added into the reactor over 15 minutes and held for 20 minutes to dissolved or partially dissolved the resulting polymer A. The obtained dispersion of polymer A with a $T_g$ of 105° C. had 26.89% by weight solids.

Preparation Monomer Emulsion 2: the polymer A obtained above (488.73 g, 26.89% by weight of solids) used as a surfactant was dissolved in deionized water (94.50 g) with stirring. The monomers EHA (187.74 g), ST (165.87 g), and DAAM (10.94 g) were added into the resultant surfactant solution to obtain Monomer Emulsion 2.

A solution containing polymer A obtained above (94.12 g, 26.89% by weight of solids) and 74.00 g water were added into a 4-neck, 3-liter round bottom flask equipped with a thermocouple, a cooling condenser and an agitator, and was heated to 89° C. under nitrogen atmosphere. An aqueous APS initiator solution (0.77 g APS in 13.74 g deionized water), and 5% by weight of Monomer Emulsion 2 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 2 was added gradually to the flask over a period of 90 minutes with stirring, and an aqueous APS initiator solution (1.61 g APS in 49.48 g deionized water) was added gradually to the flask over a period of 100 minutes. The temperature was maintained at 84-86° C. Upon completing addition, the reaction mixture was held at 70° C. for 10 minutes. A water solution of $FeSO_4.7H_2O$ (0.40 g, 0.2% active) and ethylenediaminetetraacetic acid disodium salt (EDTA) (0.08 g, 1.0% active) in 10 mL DI water was charged into the flask. Then a water solution of tert-butyl hydroperoxide (t-BHP) (9.5 g, 3.68% active) and isoascorbic acid (IAA) (9.26 g, 2.81% active) was fed into the flask over 30 minutes followed by cooling to 40° C. ADH slurry (10.41 g in 30.00 g DI water) was further added at 40° C. over 10 minutes and held for 20 minutes. The resulting dispersion was cooled to room temperature and filtered to obtain the aqueous acrylic polymer dispersion XY 0504 (pH: 9.36 and Solids: 42.85% by weight).

Examples (Exs) 1-10 and Comparative (Comp) Exs A-Q

Coating compositions of Exs 1-10 and Comp Exs A-Q were prepared based on formulations described in Tables 1, 3 and 5. Ingredients of the grind were mixed using a conventional lab mixer. The binder was added into the grind. Then other ingredients of the letdown were added into the resultant mixture. The obtained coating compositions were coated on a substrate, and then evaluated according to the test methods described above.

Properties of the obtained films were shown in Tables 2, 4 and 6.

TABLE 1

| | Coating composition, gram | | | | | | |
|---|---|---|---|---|---|---|---|
| | Ex 1 | Ex 2 | Ex 3 | Comp Ex A | Comp Ex B | Comp Ex C | Comp Ex D |
| Grind | | | | | | | |
| Water | 6.5 | 6.5 | 6.5 | 6.5 | 6.5 | 6.5 | 6.5 |
| AMP-95 | 0.1 | 0.1 | 0.1 | 0.1 | 0.1 | 0.1 | 0.1 |
| OROTAN 731A | 0.5 | 0.5 | 0.5 | 0.5 | 0.5 | 0.5 | 0.5 |
| SURFYNOL 420 | 0.1 | 0.1 | 0.1 | 0.1 | 0.1 | 0.1 | 0.1 |
| TI-PURE R-706 | 18 | 18 | 18 | 18 | 18 | 18 | 18 |
| Letdown | | | | | | | |
| XY 0504 Binder | 80 | 80 | 80 | 80 | 80 | 80 | 80 |
| BINDZIL 215 | 5.2 | | 12 | | | | 15 |
| LEVASIL 30/50 | | 3.12 | | | | | |
| LUDOX TMA | | | | | | 4.6 | |
| Water | | 3.64 | | | | | |
| DB | 4 | 4 | 4 | | | 4 | 4 |
| Aqueous ammonia solution | 2 | 2 | 2 | | | 2 | 2 |
| EB | | | | 3 | 3 | | |
| DPnB | | | | 1 | 1 | | |
| Airex 902 W | 0.2 | 0.2 | 0.2 | 0.2 | 0.2 | 0.2 | 0.2 |
| ACRYSOL 8W | 0.9 | 0.9 | 0.9 | 0.9 | 0.9 | 0.9 | 0.9 |

TABLE 1-continued

| | Coating composition, gram | | | | | | |
|---|---|---|---|---|---|---|---|
| | Ex 1 | Ex 2 | Ex 3 | Comp Ex A | Comp Ex B | Comp Ex C | Comp Ex D |
| TS 100 | | | | 3 | | | |
| MK | | | | | 3.5 | | |

Table 2 shows properties of coatings made from coating compositions of Exs 1-3 and Comp Exs A-D (coating formulations were described in Table 1). As shown in Table 2, coatings made from coating compositions of Exs 1-3 achieved acceptable low gloss (about 27.6 or lower on wood, or 12.4 on a vinyl chart) and good coffee resistance (db and dE values lower than 1.91 indicating less significant yellowing and color change after the coffee resistance testing). In contrast, coatings comprising traditional matting agents (Comp Exs A and B) showed unacceptable coffee resistance (db and dE values bigger than 2.6). The coating composition comprising LUDOX TMA colloidal silica (Comp Ex C) provided coatings with unacceptable matting effects as indicated by a 60° Gloss on a vinyl chart of about 30. The coating composition of Comp Ex D comprises silica sol larger than 4.3% by weight, based on the solids weight of the coating composition, provided coatings with unacceptable coffee resistance. In addition, the coating composition of Ex 1 provided coatings with better stain resistance to vinegar and black ink as compared to coating compositions comprising conventional matting agents (Comp Exs A and B).

TABLE 2

| | Ex 1 | Ex 2 | Ex 3 | Comp Ex A | Comp Ex B | Comp Ex C | Comp Ex D |
|---|---|---|---|---|---|---|---|
| 60° Gloss on wood | 12.2 | 27.6 | 10.3 | 11.8 | 19.8 | | 9.2 |
| 60° Gloss on a vinyl chart | 12.4 | | | | | 30.1 | |
| db (coffee resistance test) | 1.27 | 1.53 | 1.91 | 3.61 | 2.67 | | 2.14 |
| dE (coffee resistance test) | 1.47 | 1.63 | 1.9 | 3.34 | 2.68 | | 2.19 |
| dE (black ink resistance test) | 1.21 | | | 1.91 | 1.83 | | |
| dE (vinegar resistance test) | 1.69 | | | 1.91 | 1.83 | | |

Table 4 provides the 60° gloss (on a vinyl chart) of coatings made from coating compositions comprising different solvents (coating formulations were described in Table 3). As shown in Table 4, coating compositions comprising PMA (Comp Ex E), PnB (Comp Ex F), PnP (Comp Ex G), or PM (Comp Ex H) all failed to provide coatings with acceptable matting effect, as indicated by a gloss level of 54.0 or higher on a vinyl chart. In contrast, coatings made from coating compositions of Exs 4-9 all showed a gloss level of 19.0 or lower on a vinyl chart.

TABLE 3

| | | | | | Coating composition, gram | | | | | |
|---|---|---|---|---|---|---|---|---|---|---|
| | Ex 4 | Ex 5 | Comp Ex E | Ex 6 | Comp Ex F | Comp Ex G | Ex 7 | Ex 8 | Comp Ex H | Ex 9 |
| Grind | | | | | | | | | | |
| Water | 6.5 | 6.5 | 6.5 | 6.5 | 6.5 | 6.5 | 6.5 | 6.5 | 6.5 | 6.5 |
| AMP-95 | 0.1 | 0.1 | 0.1 | 0.1 | 0.1 | 0.1 | 0.1 | 0.1 | 0.1 | 0.1 |
| OROTAN 731A | 0.5 | 0.5 | 0.5 | 0.5 | 0.5 | 0.5 | 0.5 | 0.5 | 0.5 | 0.5 |
| SURFYNOL 420 | 0.1 | 0.1 | 0.1 | 0.1 | 0.1 | 0.1 | 0.1 | 0.1 | 0.1 | 0.1 |
| TI-PURE R-706 | 18 | 18 | 18 | 18 | 18 | 18 | 18 | 18 | 18 | 18 |
| Letdown | | | | | | | | | | |
| XY 0504 Binder | 80 | 80 | 80 | 80 | 80 | 80 | 80 | 80 | 80 | 80 |
| BINDZIL 215 | 5.2 | 5.2 | 5.2 | 5.2 | 5.2 | 5.2 | 5.2 | 5.2 | 5.2 | 5.2 |
| EB | 4 | | | | | | | | | |
| DPM | | 4 | | | | | | | | |
| PMA | | | 4 | | | | | | | |
| DM | | | | 4 | | | | | | |
| PnB | | | | | 4 | | | | | |
| PnP | | | | | | 4 | | | | |
| DPnP | | | | | | | 4 | | | |
| Hexyl CELLOSOLVE | | | | | | | | 4 | | |
| PM | | | | | | | | | 4 | |
| DPnB | | | | | | | | | | 4 |
| Aqueous ammonia solution | 2 | 2 | 2 | 2 | 2 | 2 | 2 | 2 | 2 | 2 |
| Airex 902 W | 0.2 | 0.2 | 0.2 | 0.2 | 0.2 | 0.2 | 0.2 | 0.2 | 0.2 | 0.2 |
| ACRYSOL 8W | 0.8 | 0.8 | 0.8 | 0.8 | 0.8 | 0.8 | 0.8 | 0.8 | 0.8 | 0.8 |

TABLE 4

| | Ex 4 | Ex 5 | Comp Ex E | Ex 6 | Comp Ex F | Comp Ex G | Ex 7 | Ex 8 | Comp Ex H | Ex 9 |
|---|---|---|---|---|---|---|---|---|---|---|
| 60° Gloss on a vinyl chart | 18.0 | 16.8 | 57.1 | 15.9 | 62.4 | 58.0 | 19.0 | 14.3 | 54.0 | 12.5 |

Table 6 shows properties of coatings made from coating compositions of Ex 10 and Comp Exs I-Q (coating formulations were described in Table 5). As shown in Table 6, coatings made from coating compositions comprising ammonia (Ex 10) showed good coffee resistance with db and dE values lower than 2. In contrast, coating compositions comprising other amine compounds and no ammonia (Comp Exs I-L) provided coatings with unacceptable coffee resistance as indicated by db and dE values higher than 2.

Coating composition of Comp Ex J, M and N comprising AMP 95 higher than 1.2% by weight, based on the solids weight of the coating composition, provided coatings with unacceptable coffee resistance (db and dE values higher than 7.3). Coating composition comprising, based on the solids weight of the coating composition, 0.5% by weight of ammonia (Comp Ex 0) and 4.0% by weight of ammonia (Comp Ex P), respectively, provided coatings with unacceptable coffee resistance.

Some gel was observed in coating composition of Comp Ex Q comprising a polyurethane dispersion right after the letdown process during preparation of the coating composition. After only 1-day heatage at 50° C., the KU viscosity of the coating composition of Comp Ex Q increased by about 18 units as compared to about 0.3 unit KU viscosity change (ΔKU) of the coating composition of Ex 1.

TABLE 5

| | | | | | Coating Composition, gram | | | | | |
|---|---|---|---|---|---|---|---|---|---|---|
| | Comp Ex I | Comp Ex J | Comp Ex K | Comp Ex L | Comp Ex M | Comp Ex N | Comp Ex O | Ex 10 | Comp Ex P | Comp Ex Q |
| Grind | | | | | | | | | | |
| Water | 6.5 | 6.5 | 6.5 | 6.5 | 6.5 | 6.5 | 6.5 | 6.5 | 6.5 | 6.5 |
| AMP-95 | 0.1 | 0.1 | 0.1 | 0.1 | 0.1 | 0.1 | 0.1 | 0.1 | 0.1 | 0.1 |
| OROTAN 731A | 0.5 | 0.5 | 0.5 | 0.5 | 0.5 | 0.5 | 0.5 | 0.5 | 0.5 | 0.5 |
| SURFYNOL 420 | 0.1 | 0.1 | 0.1 | 0.1 | 0.1 | 0.1 | 0.1 | 0.1 | 0.1 | 0.1 |
| TI-PURE R-706 | 18 | 18 | 18 | 18 | 18 | 18 | 18 | 18 | 18 | 18 |
| Letdown | | | | | | | | | | |
| XY 0504 Binder | 80 | 80 | 80 | 80 | 80 | 80 | 80 | 80 | 80 | |
| PRIMAL Binder U-91 | | | | | | | | | | 80 |

TABLE 5-continued

| | Coating Composition, gram | | | | | | | | | |
|---|---|---|---|---|---|---|---|---|---|---|
| | Comp Ex I | Comp Ex J | Comp Ex K | Comp Ex L | Comp Ex M | Comp Ex N | Comp Ex O | Ex 10 | Comp Ex P | Comp Ex Q |
| BINDZIL 215 | 5.2 | 5.2 | 5.2 | 5.2 | 5.2 | 5.2 | 5.2 | 5.2 | 5.2 | 5.2 |
| IPDA | 1 | | | | | | | | | |
| AMP-95 | | 2 | | | 1 | 0.5 | | | | |
| DMEA | | | 1 | | | | | | | |
| Aqueous ammonia solution | | | | | 2 | 2 | 1 | 6 | 8 | 2 |
| N-MEA | | | | 2 | | | | | | |
| DB | 4 | 4 | 4 | 4 | 4 | 4 | 4 | 4 | 4 | 4 |
| Airex 902 W | 0.2 | 0.2 | 0.2 | 0.2 | 0.2 | 0.2 | 0.2 | 0.2 | 0.2 | 0.2 |
| ACRYSOL 8W | 0.9 | 0.9 | 0.9 | 0.9 | 0.9 | 0.9 | 0.9 | 0.9 | 0.9 | 0.9 |

TABLE 6

| | Comp Ex I | Comp Ex J | Comp Ex K | Comp Ex L | Comp Ex M | Comp Ex N | Comp Ex O | Ex 10 | Comp Ex P |
|---|---|---|---|---|---|---|---|---|---|
| 60° Gloss on wood | 24.7 | 22.5 | 19.0 | 19.6 | 28.4 | 29.0 | 29.1 | 17.2 | 16 |
| db (coffee resistance test) | 3.89 | 7.36 | 2.76 | 3.95 | 4.09 | 3.02 | 2.08 | 1.67 | 2.05 |
| dE (coffee resistance test) | 3.93 | 7.71 | 2.86 | 4.18 | 4.30 | 3.05 | 2.16 | 1.67 | 2.06 |

Comp Ex R

Comp Ex R was prepared substantially the same as described in CN102190936A. Ten g of BINDZIL 2040 colloidal silica, 0.5 g of SILQUEST™ A-187 epoxy functional silane available from Momentive Performance Materials Holdings LLC., and 3 g of DB were mixed with a high speed disperser at room temperature. The resulting composition showed many visible grit particles after storage at room temperature for only 30 minutes and was not suitable for coating applications.

What is claimed is:

1. An aqueous coating composition comprising, based on the total solids weight of the aqueous coating composition,
    (a) an aqueous acrylic polymer dispersion present in an amount of from 10% to 90% by solids weight;
    (b) anionic colloidal silica present in an amount of from 0.1% to 4.3% by solids weight;
    (c) a solvent present in an amount of from 0.1% to 7% by weight, wherein the solvent has the following structure:

    $R_1\text{—}(OR_2)_n\text{—}OH$ wherein $R_1$ is a saturated hydrocarbon group having from 1 to 6 carbon atoms, $R_2$ is —$CH_2CH_2$— or —$CH_2CH(CH_3)$—; and n is an integer from 1 to 4 when $R_2$ has the structure of —$CH_2CH_2$—, or n is an integer from 2 to 4 when $R_2$ has the structure of —$CH_2CH(CH_3)$—;
    (d) ammonia present in an amount of from 0.55% to 4.2% by weight;
    (e) an amine compound present in an amount less than 1.2% by weight; and
    (f) titanium dioxide,
    wherein the aqueous coating composition is substantially free of silane coupling agents.

2. The aqueous coating composition of claim 1, wherein the anionic colloidal silica has a pH value >8.5.

3. The aqueous coating composition of claim 1, wherein the anionic colloidal silica is present in an amount of from 1% to 3.5% by solids weight.

4. The aqueous coating composition of claim 1, wherein silica particles in the anionic colloidal silica have a specific surface area of from 20 to 800 $m^2/g$.

5. The aqueous coating composition of claim 1, wherein ammonia is present in an amount of from 1% to 3% by weight.

6. The aqueous coating composition of claim 1, wherein the solvent is selected from ethylene glycol monobutyl ether, ethylene glycol monohexyl ether, diethylene glycol methyl ether, diethylene glycol monobutyl ether, dipropylene glycol n-butyl ether, dipropylene glycol n-propyl ether, dipropylene glycol methyl ether, or mixtures thereof.

7. The aqueous coating composition of claim 1, wherein the solvent is present in an amount of from 1% to 6% by weight.

8. The aqueous coating composition of claim 1, wherein the acrylic polymer has a glass transition temperature of from 0° C. to 60° C.

9. The aqueous coating composition of claim 1, wherein the aqueous coating composition upon drying exhibits a gloss level of no more than 20 on a vinyl chart or no more than 30 on wood on a 60° Gardner Gloss scale, and both delta b and delta E values smaller than 2.0.

10. A process of preparing the aqueous coating composition of claim 1, comprising admixing: (a) the aqueous acrylic polymer dispersion, (b) the anionic colloidal silica, (c) the solvent, (d) ammonia, (e) the amine compound, and (f) titanium dioxide.

* * * * *